US012730466B1

(12) United States Patent
Lenka et al.

(10) Patent No.: US 12,730,466 B1
(45) Date of Patent: Sep. 8, 2026

(54) VOLTAGE REGULATOR IMPROVING POWER SUPPLY REJECTION RATIO USING A HIGH GAIN LOOP

(71) Applicant: Cadence Design Systems, Inc., San Jose, CA (US)

(72) Inventors: Prakash Kumar Lenka, Orissa (IN); Harsh Anil Shakrani, Maharashtra (IN); Hari Anand Ravi, Bangalore (IN); Sachin Ramesh Gugwad, Bangalore (IN); Vinod Kumar, Uttar Pradesh (IN)

(73) Assignee: Cadence Design Systems, Inc., San Jose, CA (US)

( * ) Notice: Subject to any disclaimer, the term of this patent is extended or adjusted under 35 U.S.C. 154(b) by 154 days.

(21) Appl. No.: 18/381,750

(22) Filed: Oct. 19, 2023

(51) Int. Cl.
*G05F 1/575* (2006.01)

(52) U.S. Cl.
CPC .................................... *G05F 1/575* (2013.01)

(58) Field of Classification Search
CPC ....................................................... G05F 1/575
See application file for complete search history.

(56) References Cited

U.S. PATENT DOCUMENTS

2007/0018621 A1* 1/2007 Mok ....................... G05F 1/575 323/280
2017/0023958 A1* 1/2017 Dixit ......................... G05F 1/56
2017/0371365 A1* 12/2017 Kossel ...................... G05F 1/46

FOREIGN PATENT DOCUMENTS

CN 208888682 U * 5/2019

OTHER PUBLICATIONS

Machine translation of CN-208888682 by Clarivate Analytics, Jun. 2025, 7 pages.*

* cited by examiner

*Primary Examiner* — Harry R Behm
(74) *Attorney, Agent, or Firm* — Mark H. Whittenberger; Holland & Knight LLP

(57) ABSTRACT

Embodiments included herein are directed towards a voltage regulator circuit. The circuit may include a first stage amplifier circuitry and high gain loop connection circuitry electrically connected with the first stage amplifier circuitry. The high gain loop connection circuitry may include common source amplifier circuitry directly connected with a compensation capacitor that is directly connected with a transistor associated with the first stage amplifier circuitry.

20 Claims, 11 Drawing Sheets

700

100

200

300

400

500

600

700

800

900

1000

VOLTAGE REGULATOR IMPROVING POWER SUPPLY REJECTION RATIO USING A HIGH GAIN LOOP

BACKGROUND

Voltage regulators are used in electronic systems to help to automatically maintain some constant desired voltage. The power supply rejection (PSR) is a factor that determines a regulator's output noise with respect to the supply noise on the power supply of the voltage regulator.

SUMMARY

In one or more embodiments of the present disclosure, a voltage regulator circuit is provided. The circuit may include a first stage amplifier circuitry and high gain loop connection circuitry electrically connected with the first stage amplifier circuitry. The high gain loop connection circuitry may include common source amplifier circuitry directly connected with a compensation capacitor that is directly connected with a transistor associated with the first stage amplifier circuitry.

One or more of the following features may be included. In some embodiments, the common source amplifier circuitry obtains negative gain so that the high gain loop connection circuitry forms a negative feedback loop. The first stage amplifier circuitry may be directly connected with a second compensation capacitor. The first compensation capacitor and the second compensation capacitor may have different values. The voltage regulator circuit may operate at a frequency between 50-500 MHz.

In another embodiment of the present disclosure a voltage regulator circuit is provided. The voltage regulator circuit may include first stage amplifier circuitry and high gain loop connection circuitry electrically connected with the first stage amplifier circuitry. The high gain loop connection circuitry may include a common source amplifier circuitry directly connected with a compensation capacitor that is electrically connected with a drain of a transistor associated with the first stage amplifier circuitry.

One or more of the following features may be included. In some embodiments, the common source amplifier circuitry obtains negative gain so that the high gain loop connection circuitry forms a negative feedback loop. The first stage amplifier circuitry may be directly connected with a second compensation capacitor. The first compensation capacitor and the second compensation capacitor may have different values. The voltage regulator circuit may operate at a frequency between 50-500 MHz.

In yet another embodiment of the present disclosure, a voltage regulator circuit is provided. The voltage regulator circuit may include first stage amplifier circuitry and high gain loop connection circuitry electrically connected with the first stage amplifier circuitry. The high gain loop connection circuitry may include a common source amplifier circuitry directly connected with a compensation capacitor that is electrically connected with a source of a transistor associated with the first stage amplifier circuitry.

One or more of the following features may be included. In some embodiments, the common source amplifier circuitry obtains negative gain so that the high gain loop connection circuitry forms a negative feedback loop. The first stage amplifier circuitry may be directly connected with a second compensation capacitor. The first compensation capacitor and the second compensation capacitor may have different values. The voltage regulator circuit may operate at a frequency between 50-500 MHz.

In another embodiment of the present disclosure a voltage regulator method is provided. The method may include providing first stage amplifier circuitry and electrically connecting high gain loop connection circuitry with the first stage amplifier circuitry. The high gain loop connection circuitry may include a common source amplifier circuitry directly connected with a compensation capacitor that is directly connected with a transistor associated with the first stage amplifier circuitry.

One or more of the following features may be included. In some embodiments, the common source amplifier circuitry obtains negative gain so that the high gain loop connection circuitry forms a negative feedback loop. The first stage amplifier circuitry may be directly connected with a second compensation capacitor. The first compensation capacitor and the second compensation capacitor may have different values. The voltage regulator circuit may operate at a frequency between 50-500 MHz.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Embodiments of the present disclosure are directed towards voltage regulator circuits and methods of using the same.

Figure 1:
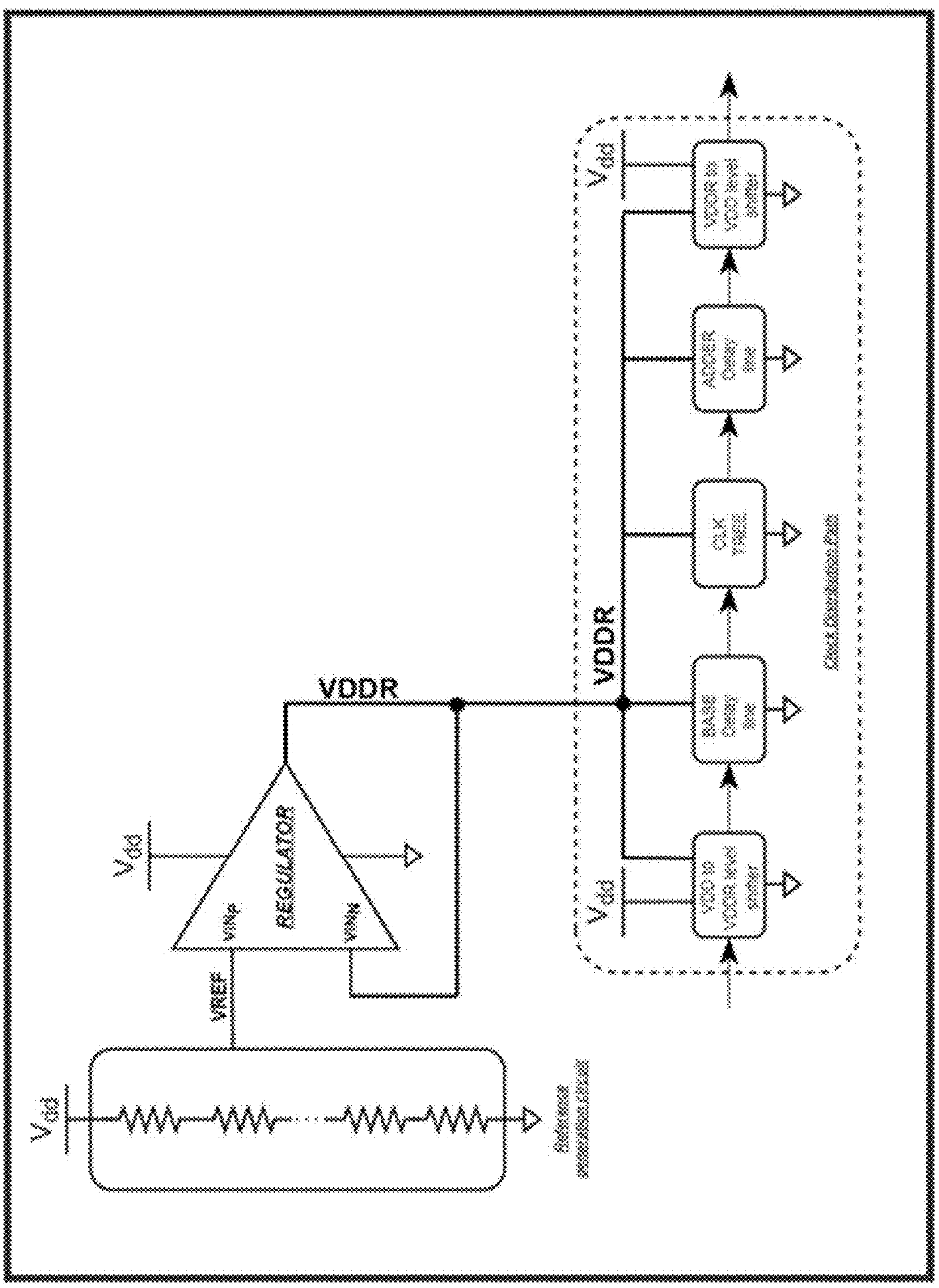
FIG. 1 is an example block diagram of a voltage regulator and delay line consistent with embodiments of the present disclosure.

Referring now to FIG. 1, an example block diagram 100 of a voltage regulator and delay line consistent with embodiments of the present disclosure is provided. In a memory subsystem, the data (DQ) transmitted from one end is sampled at another end with the help of a data strobe (DQS). Even if both the DQ and DQS are transmitted together from one end, there will be skew between them when reached at another end because of channel cross talk, board/package skew, etc. Therefore, a high PSR regulator is often needed. To address skew and to align strobe at the center of data so that the data is sampled correctly, DQ and DQS may be passed through a clocking path, which may include a delay line and clock tree. The delay may be set to multiple unit intervals depending on the skew between the data and the strobe. Due to the delay difference between the DQ and DQS paths, DQ and DQS jitter may not track each other in the presence of power supply noise. As such, the power supply induced jitter (PSIJ) between the DQ and DQS may be high and may reduce the timing margin. To reduce the deterministic jitter of the delay line, a low level of variation of the supply on the delay line supply node may be needed. This, in turn, may require the use of a regulator having a high PSR. The PSR may be the primary factor that determines the regulator's output noise with respect to supply noise on the power supply of the regulator.

Figure 2:
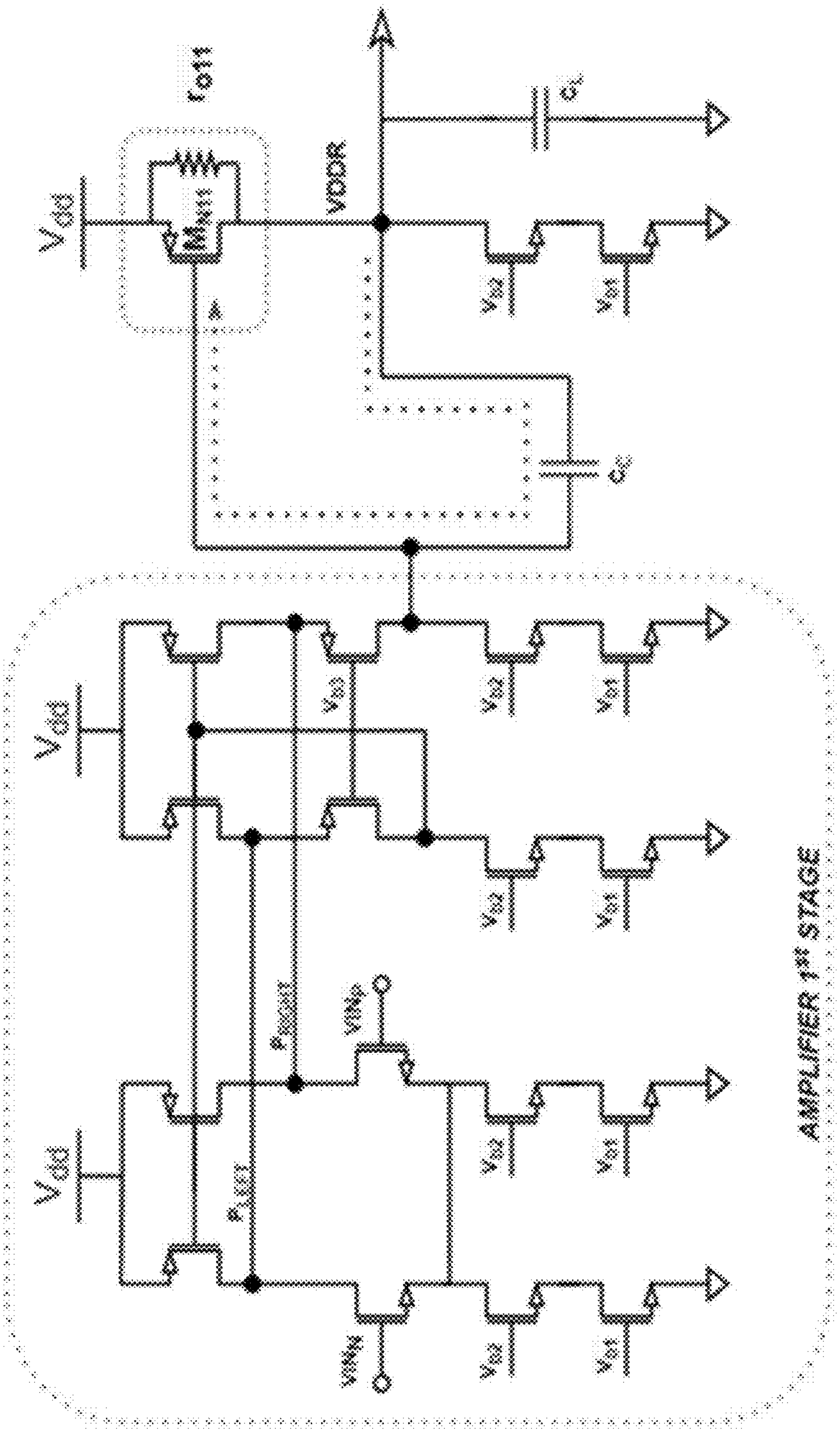
FIG. 2 is an example of a two-stage amplifier with Miller compensation consistent with embodiments of the present disclosure.
Figure 3:
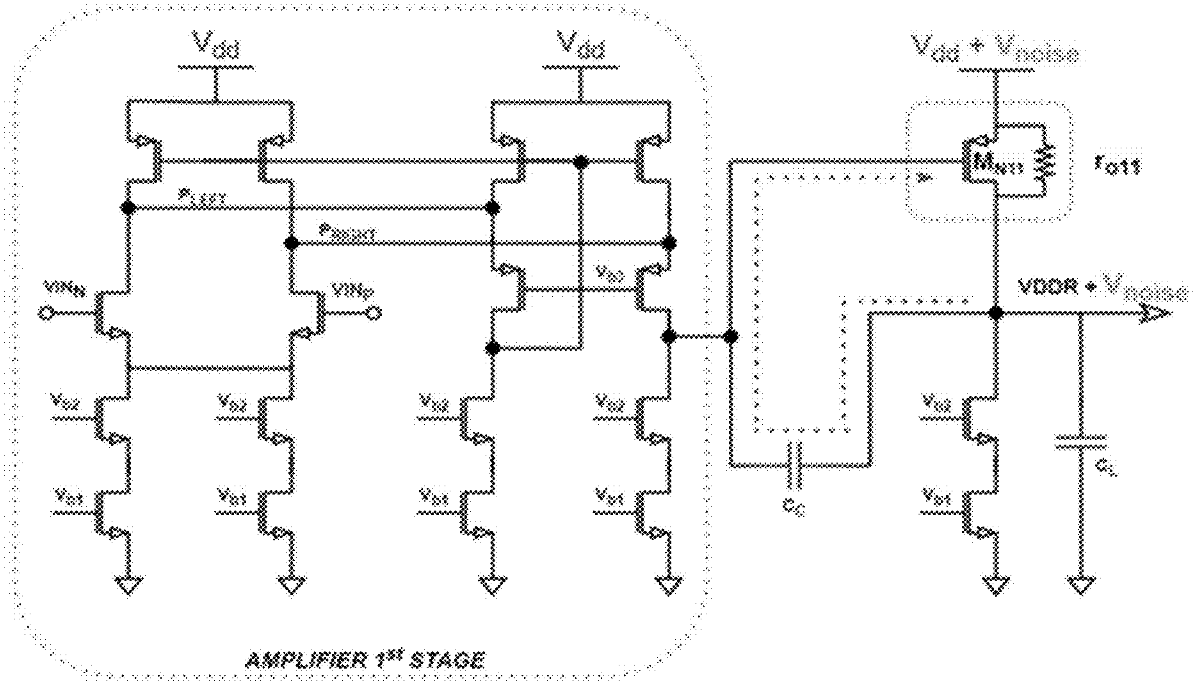
FIG. 3 is an example showing the effect of supply noise on Miller compensation consistent with embodiments of the present disclosure.

Referring now to FIG. 2, an example of a two-stage amplifier 200 with Miller compensation consistent with embodiments of the present disclosure is provided. The core of voltage regulator includes first stage amplifier circuitry. This circuitry may be connected in a negative feedback configuration in order to help in rejecting power supply noise. FIG. 2 shows an existing approach of designing the regulator's amplifier with Miller compensation. In this example, the VDDR net is connected to VINN which forms an outer loop (slower loop), forming unity gain feedback. A Miller compensation capacitor (Cc) connection from the $2^{nd}$ stage output to the output of the $1^{st}$ stage forms an inner loop (faster loop). The Miller compensation is used to achieve better stability (higher phase margin) when compared to an approach where no compensation is employed. Here, the non-dominant pole is given as wp2=gm11/CL Referring now to FIG. 3, an example circuit 300 showing the effect of supply noise on Miller compensation consistent with embodiments of the present disclosure is provided. The circuits of FIGS. 2-3 suffer from a number of limitations. The increase in phase margin is obtained in Miller compensation technique by shifting the dominant pole to the lower frequency and non-dominant pole to the higher frequency. This reduces the overall bandwidth of the amplifier, thereby reducing the PSR at higher frequencies (e.g., 50 MHz to 500 MHz). The $V_{noise}$ applied on the supply may be almost fully reflected at the VDDR node.

Figure 4:
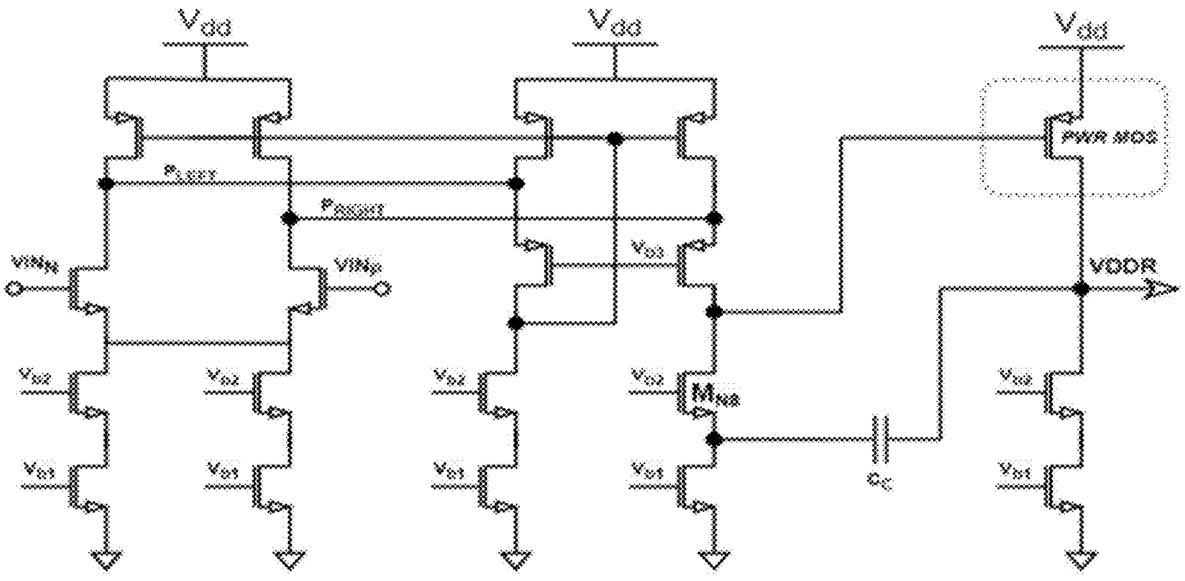
FIG. 4 is an example of Ahuja compensation consistent with embodiments of the present disclosure.

Referring now to FIG. 4 is an example circuit 400 showing Ahuja compensation consistent with embodiments of the present disclosure is provided. The $C_c$ in an Ahuja compensation example is connected to the source of MN8 instead of the output of $1^{st}$ stage. This prevents the feed forward path from the $1^{st}$ stage to the $2^{nd}$ stage output but maintains a feedback path through Cc and the MN8 transistor. Due to this, the dominant pole may remain the same as the Miller compensation example. The non-dominant pole of the amplifier is far compared to Miller compensation $$w_{p2} = \frac{(gm_8 * r_{08} * gm_{11})}{C_L} \quad \text{EQUATION 1}$$

thus, achieving better stability (higher PM) than Miller compensation. The increase in phase margin provides more room to shift the dominant pole to a higher frequency, thereby increasing the UGB and increasing the PSR of the circuit.

Figure 5:
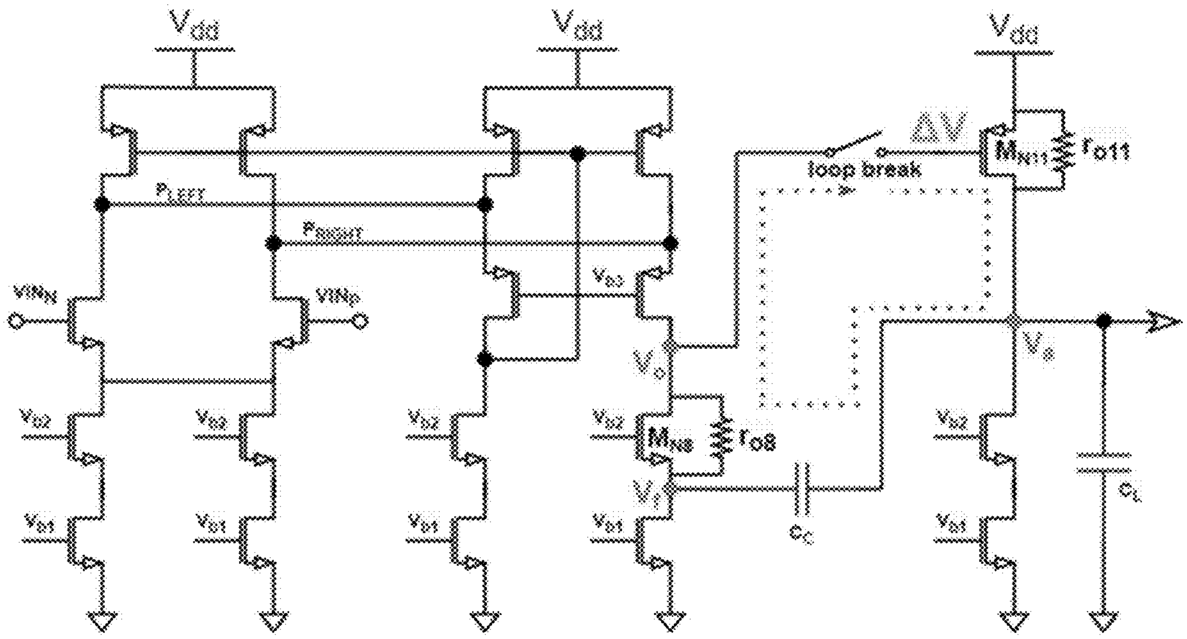
FIG. 5 is an example of Ahuja compensation inner loop gain consistent with embodiments of the present disclosure.

Referring now to FIG. 5, an example circuit 500 showing Ahuja compensation inner loop gain consistent with embodiments of the present disclosure is provided. The DC gain of the faster (inner) loop may be obtained by applying ΔV voltage at the output of first stage. Assuming $C_c$ to be approximately short:

$$V_a \cong gm_{11} * r_{011} * (-\Delta V) \quad \text{EQUATION 2}$$

$$V_f = V_a \cong gm_{11} * r_{011} * (-\Delta V) \quad \text{EQUATION 3}$$

$$V_o \cong gm_8 * r_{08} * V_f \quad \text{EQUATION 4}$$

$$A_{vol} \cong \frac{V_o}{\Delta V} \cong (-gm_8) * r_{08} * gm_{11} * r_{011} \quad \text{EQUATION 5}$$

The gain of inner loop is higher compared to the Miller compensation example. Therefore, any correction of noise on the VDDR node is improved.

Figure 6:
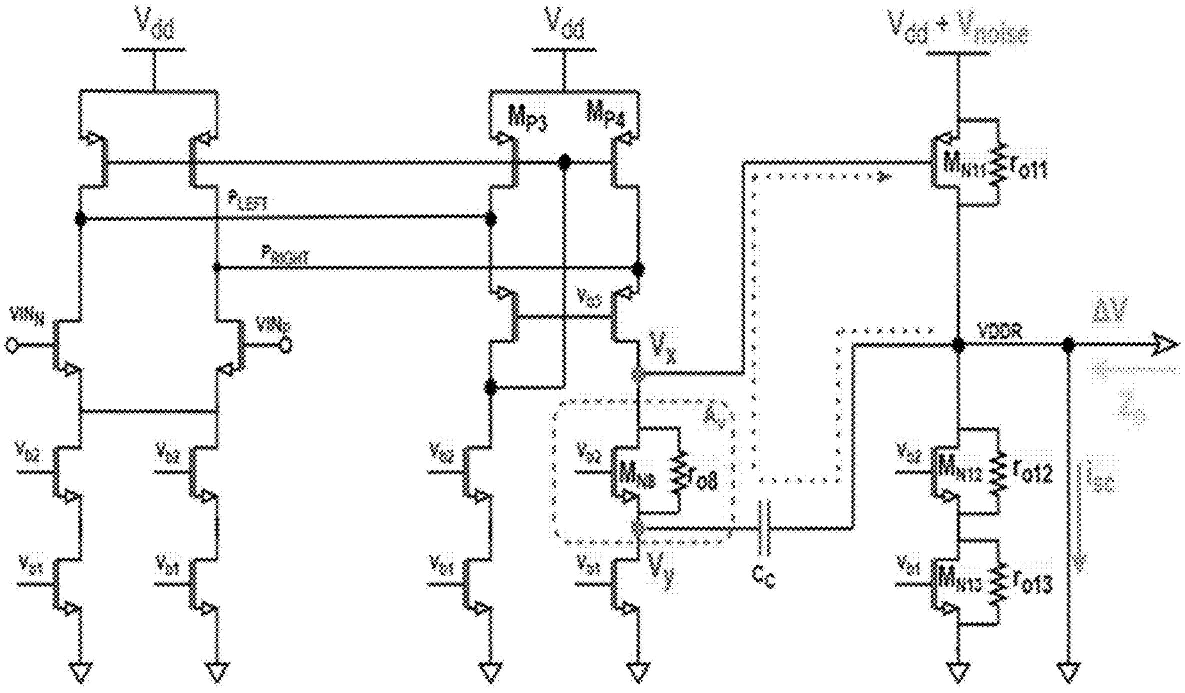
FIG. 6 is an example showing the effect of supply noise on Ahuja compensation consistent with embodiments of the present disclosure.

Referring now to FIG. 6, an example circuit 600 showing the effect of supply noise on Ahuja compensation consistent with embodiments of the present disclosure is provided. The attenuation of supply noise on the VDDR net may be found out by Norton's theorem, i.e., finding isc and Zo at VDDR net. Assuming $C_c$ to be approximately short:

$$i_{sc} = gm_{11} * V_{noise} \quad \text{EQUATION 6}$$

$$A_v \cong gm_8 * r_{o8} \quad \text{EQUATION 7}$$

$$Z_o = \frac{1}{gm_{11} * A_v} \quad \text{EQUATION 8}$$

$$\Delta V = i_{sc} * Z_o \quad \text{EQUATION 9}$$

$$\Delta V = gm_{11} * V_{noise} * \frac{1}{gm_{11} * A_v} \quad \text{EQUATION 10}$$

$$\frac{\Delta V}{V_{noise}} = \frac{1}{A_v} \quad \text{EQUATION 11}$$

The circuit of FIG. 6 suffers from a number of limitations. The higher the inner loop gain, the better the noise suppression. And the inner loop gain is given as gm8*ro8. Obtaining a higher loop gain through the same architecture may be achieved by either increasing the gm8 or increasing ro8. Through any means this may increase the capacitor on the $1^{st}$ stage output and also at the expense of extra power consumption. Thus, shifting the dominant pole to a lower frequency and reducing PSR. Therefore, the gain of inner loop may not be increased beyond one point, and this limits the PSR.

In light of the above, the PSR of the voltage regulator directly impacts the jitter performance of the delay line. Accordingly, the higher the PSR, the lower the noise on the power supply of the delay line and the jitter may also improve. With a voltage regulator running on the core power supply (e.g., VDD as low as 675 mV) and VDDR being close to VDD (e.g.,: 0.92*VDD, so the delay line is less sensitive to the power supply), the VDS of the power MOS may be reduced, which reduces the PSR itself. Moving the voltage regulator to the IO supply (e.g., VDDQ as low as 1.03V) may increase the PSR and improve the jitter. However, this may be achieved at the cost of power, which highlights the need for improved PSR. A higher PSR in the core device architecture may be achieved by either increasing the gain or moving the dominant pole to a higher frequency. In both cases there may be a reduction in phase margin, and the system becomes unstable. Increasing the gain of inner loop will add more parasitic capacitance to the output of the 1st stage, reducing the high frequency gain. The noise on the supply is in the mid-frequency domain range (e.g., 50 MHz to 500 Mhz). Therefore, there is a need for increasing the gain of the inner loop (improving the PSR) in a different way than the supply noise frequency range, without increasing the power consumption of the regulator.

Figure 7:
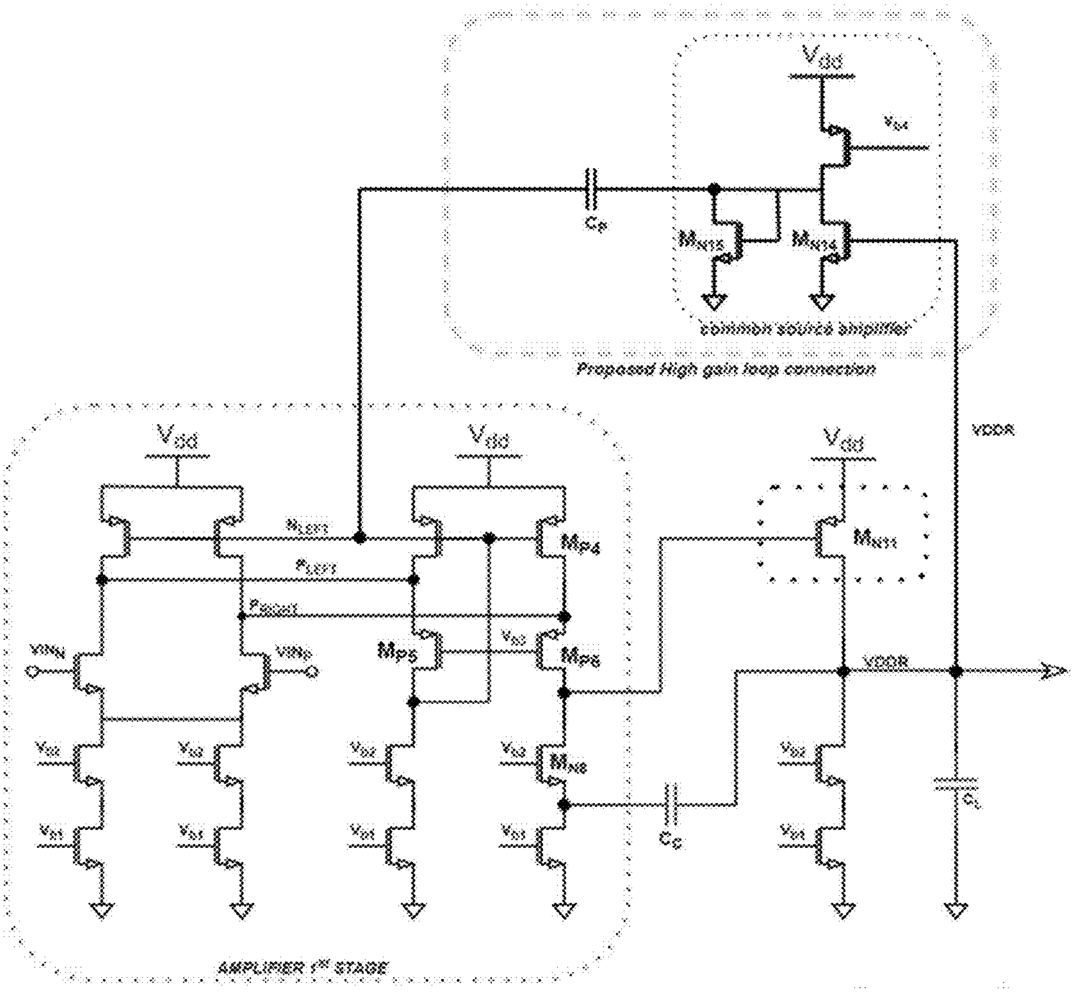
FIG. 7 is an example circuit consistent with embodiments of the present disclosure.

Referring now to FIG. 7, an example circuit 700 consistent with embodiments of the present disclosure is provided. Circuits described herein may include an additional loop, which provides high gain and helps in a greater suppression of supply noise at the VDDR net with negligible extra power consumption. The additional loop may be formed by connecting the VDDR net through a common source amplifier and compensation capacitor ($C_p$) to $N_{LEFT}$ (Drain of $M_{P5}$) and the signal may follow through $M_{P4}$-$M_{P6}$-PWR MOS and back to the VDDR net. The common source amplifier may be used to obtain negative gain so that the proposed loop forms negative feedback. Common source amplifier gain may be close to unity $$\left(\sim \frac{gm_{N14}}{gm_{N15}}\right).$$

The compensation through $C_c$ remains to get higher PM with non-dominant pore sun al $$w_{p2} = \frac{(gm_8 * ro_8 * gm_{11})}{C_L},$$

similar to Ahuja compensation. This loop may be particularly useful at the mid-frequency level (e.g., 50-500 Mhz), which is also the range of supply noise frequency.

Figure 8:
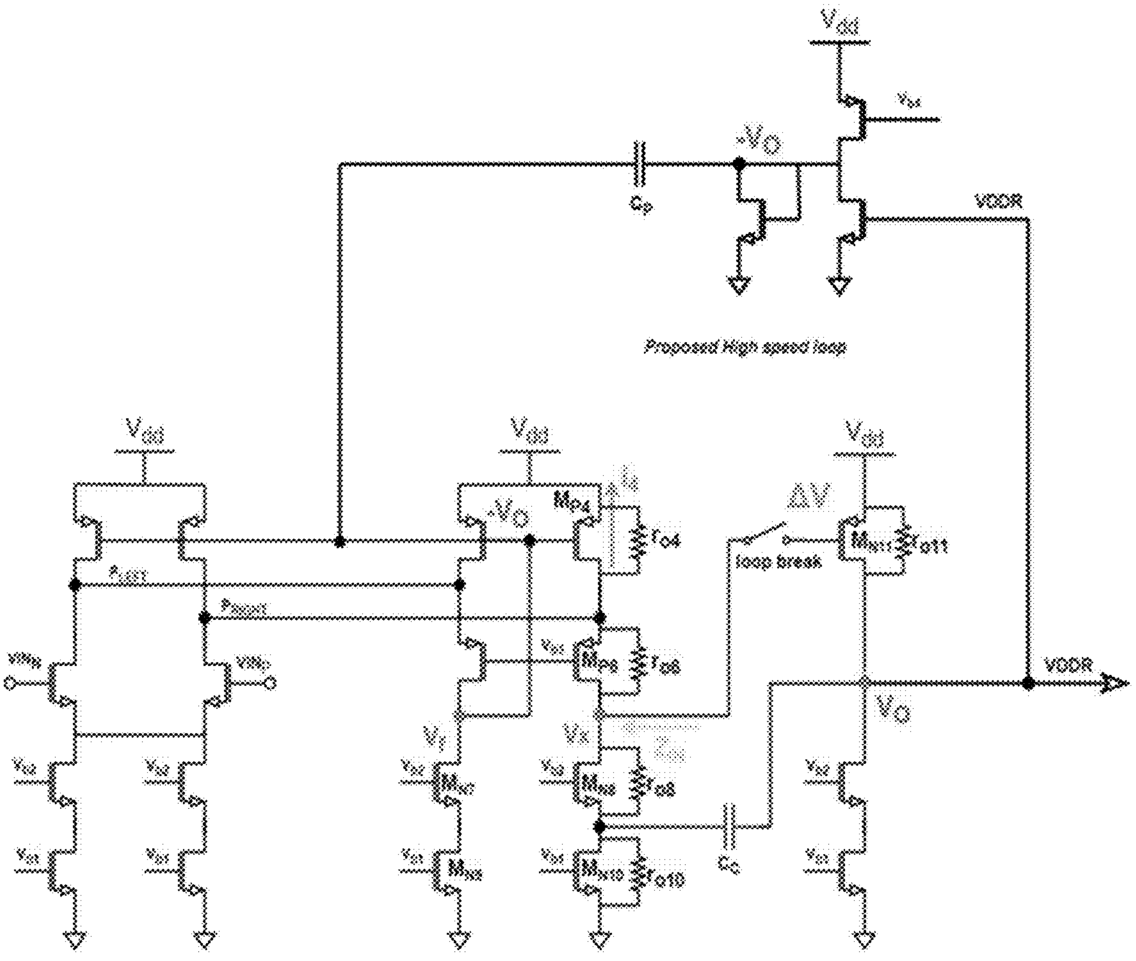
FIG. 8 is an example circuit showing loop gain consistent with embodiments of the present disclosure.

Referring now to FIG. 8, an example circuit 800 showing loop gain consistent with embodiments of the present disclosure is provided. Embodiments included herein provide a much higher inner loop gain than all other previous architectures. The loop gain may be obtained by breaking the loop at the output of the $1^{st}$ stage and then applying $\Delta V$ at the gate of the $M_{N11}$ transistor and checking the value at $V_x$. Considering $C_p$ approximately short in the mid-frequency range thus, $(-V_o)$ appears at the gate of $M_{P4}$ transistor.

$$V_o \cong (-gm_{11}) * r_{o11} * \Delta V \quad \text{EQUATION 12}$$

$$i_4 = (-V_o) * gm_4 \quad \text{EQUATION 13}$$

$$V_x = (-i_4) * Z_{IN} \quad \text{EQUATION 14}$$

$$Z_{IN} = [(r_{o4} * (gm_6 * r_{o6})) \| (r_{o10} * (gm_8 * r_{o8}))] \quad \text{EQUATION 15}$$

$$V_x \cong gm_4 * V_o * [(r_{o4} * (gm_6 * r_{o6})) \| (r_{o10} * (gm_8 * r_{o8}))] \quad \text{EQUATION 16}$$

$$V_x \cong (-gm_4) * \Delta V * gm_{11} * r_{o11} * [(r_{o4} * (gm_6 * r_{o6})) \| (r_{o10} * (gm_8 * r_{o8}))] \quad \text{EQUATION 17}$$

$$A_{vol} \cong \frac{V_x}{\Delta V} \cong (-gm_4) * gm_{11} * r_{o11} * [(r_{o4} * (g_{m6} * r_{06})) \| (r_{o10} * (gm_8 * r_{o8}))] \quad \text{EQUATION 18}$$

Figure 9:
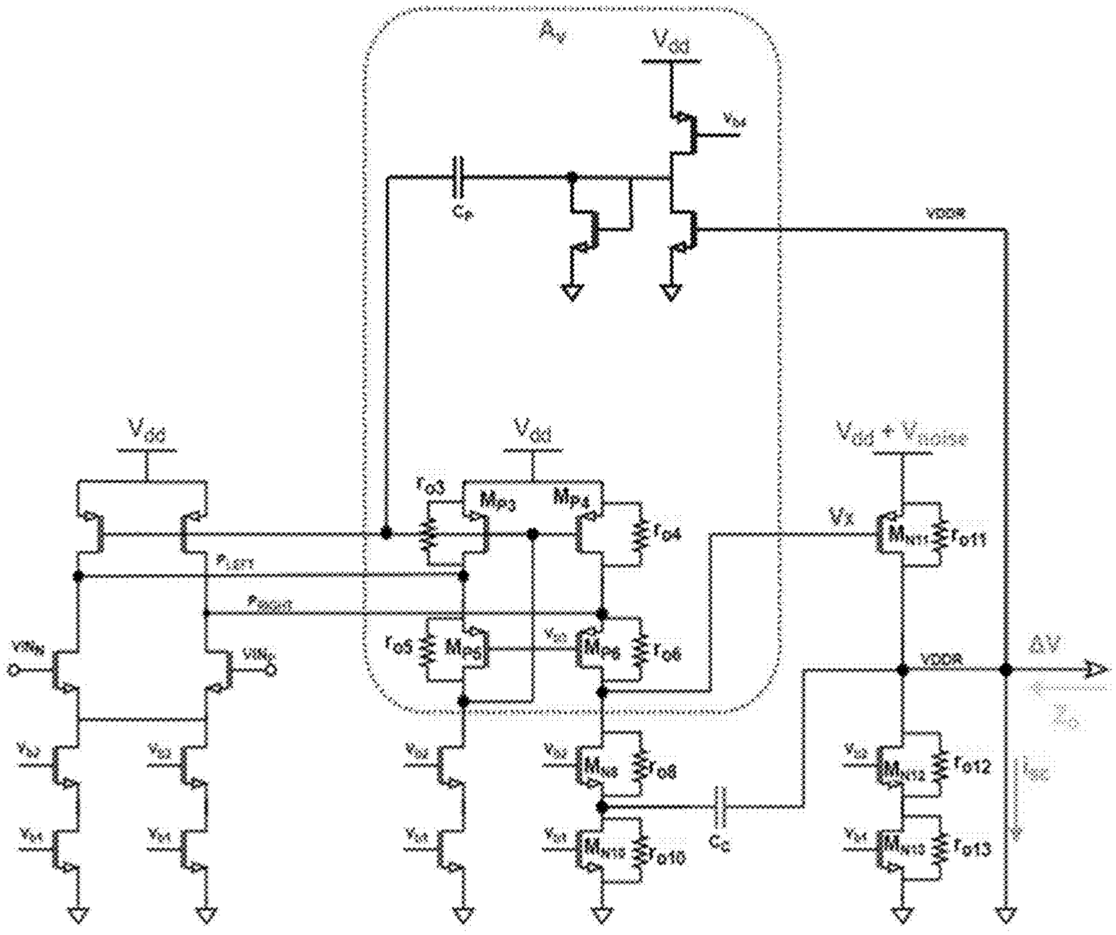
FIG. 9 is an example circuit showing mid-frequency noise analysis consistent with embodiments of the present disclosure.

Referring now to FIG. 9, an example circuit 900 showing mid-frequency noise analysis consistent with embodiments of the present disclosure is provided. This particular example may include two inner loops. In some embodiments, the circuits included herein may (high gain) operates in mid-frequency range 50 MHz-500 MHz wherein the Ahuja compensation of the prior circuits through $C_c$ operates at high frequency range. The attenuation of supply noise achieved using embodiments of the present disclosure on VDDR net may be determined using Norton's theorem e.g., finding $i_{sc}$ and $Z_O$ at VDDR net. Assuming $C_p$ to be approximately short:

$$\Delta V = i_{sc} * Z_o \quad \text{EQUATION 19}$$

$$Z_o = \frac{1}{gm_{11} * A_v} \quad \text{EQUATION 20}$$

$$i_{sc} \cong gm_{11} * V_{noise} \quad \text{EQUATION 21}$$

$$\Delta V = gm_{11} * V_{noise} * \frac{1}{gm_{11} * A_v} \quad \text{EQUATION 22}$$

$$\frac{\Delta V}{V_{noise}} = \frac{1}{A_v} \quad \text{EQUATION 23}$$

$$A_v \cong gm_4 * [(r_{o4} * (gm_6 * r_{o6})) \| (r_{o10} * (gm_8 * r_{o8}))] \quad \text{EQUATION 24}$$

Accordingly, embodiments included herein may provide a greater suppression of supply noise for the mid-frequency range due to the higher loop gain.

Figure 10:
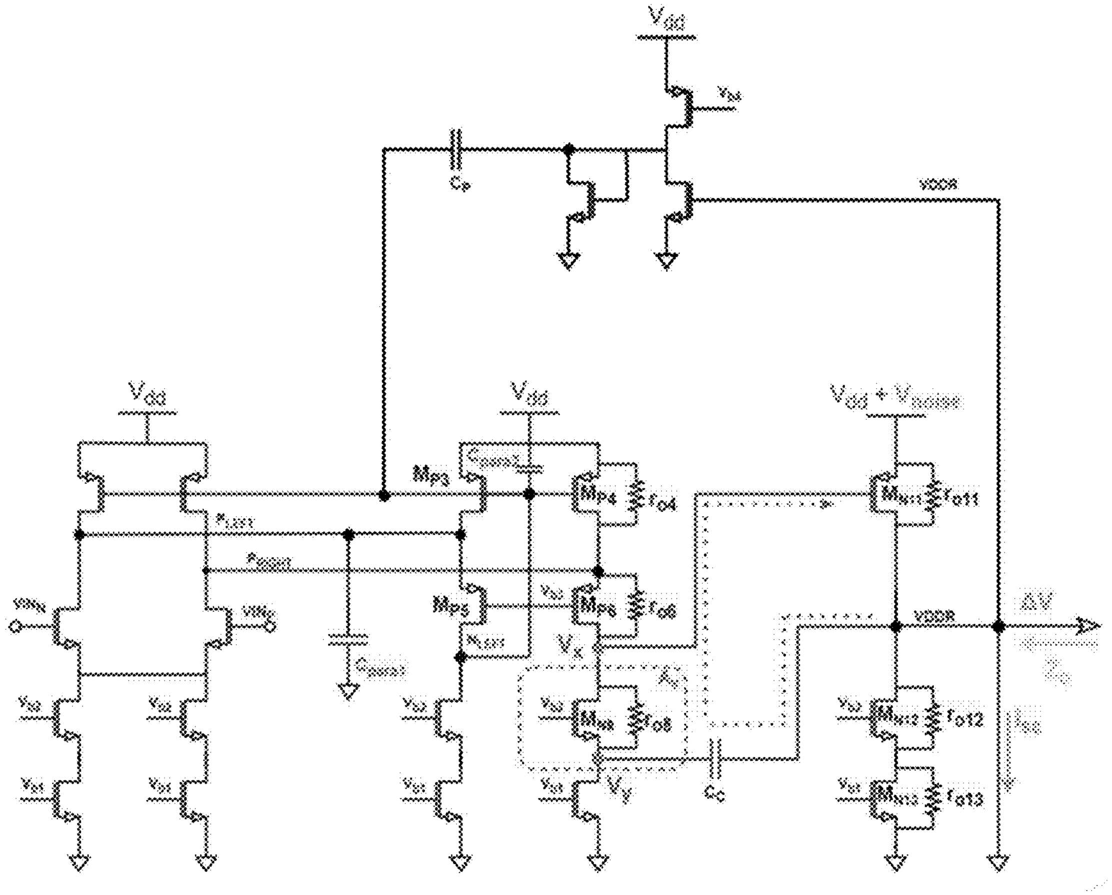
FIG. 10 is an example circuit showing high-frequency noise analysis consistent with embodiments of the present disclosure.

Referring now to FIG. 10, an example circuit showing high-frequency noise analysis consistent with embodiments of the present disclosure is provided. The effect of parasitic capacitors Cpara1 and Cpara2 may be seen in the high frequency range and at high frequency the impedance of cap Cpara1 and Cpara2 reduces. Thus, reducing the loop gain some embodiments at high frequency. The loop through $C_c$ remains active in the high frequency range and provides decent gain. Therefore, obtaining good phase margin (stability) and unity gain bandwidth (UGB). The effect of supply noise on the VDDR net is similar to the Ahuja compensation architecture discussed above. Assuming Cc to be approximately short:

$$i_{sc} = gm_{11} * V_{noise} \quad \text{EQUATION 25}$$

$$Z_o = \frac{1}{gm_{11} * A_v} \quad \text{EQUATION 26}$$

-continued $$\Delta V = i_{sc} * Z_o \quad \text{EQUATION 27}$$

$$\Delta V = gm_{11} * V_{noise} * \frac{1}{gm_{11} * A_v} \quad \text{EQUATION 28}$$

$$\frac{\Delta V}{V_{noise}} = \frac{1}{A_v} \quad \text{EQUATION 29}$$

$$A_v \cong gm_8 * r_{o8} \quad \text{EQUATION 30}$$

Figure 11:
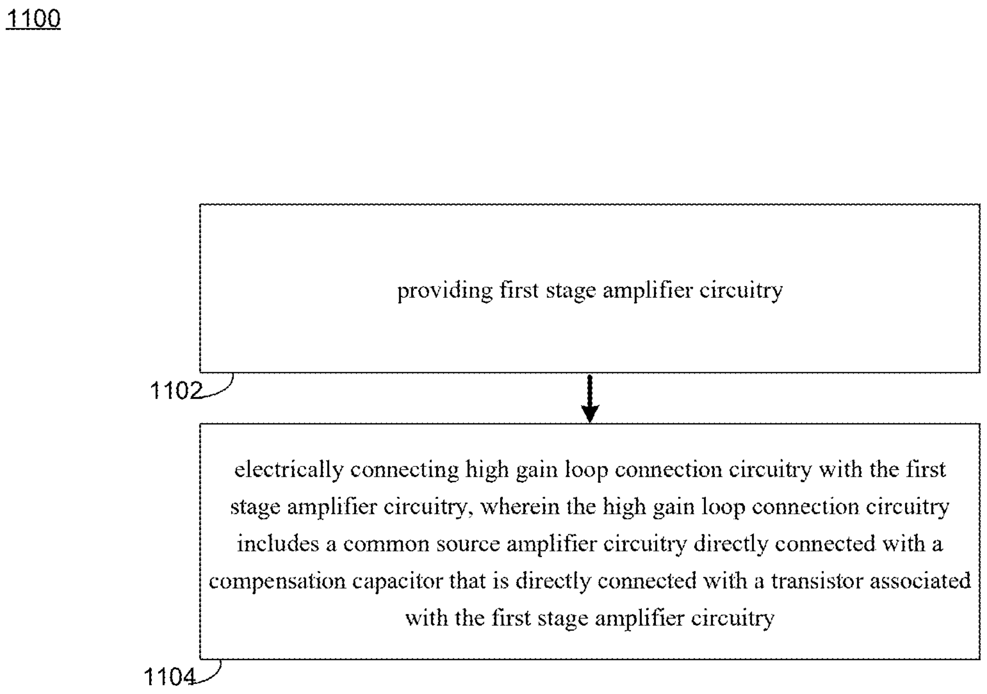
FIG. 11 is an example flowchart showing exemplary operations according to an embodiment of the present disclosure.

Referring now to FIG. 11, a voltage regulator method consistent with embodiments of the present disclosure is provided. The method may include providing (1102) first stage amplifier circuitry and electrically connecting (1104) high gain loop connection circuitry with the first stage amplifier circuitry. The high gain loop connection circuitry may include a common source amplifier circuitry directly connected with a compensation capacitor that is directly connected with a transistor associated with the first stage amplifier circuitry. Numerous additional operations are also within the scope of the present disclosure.

Embodiments of the present disclosure provide numerous advantages over existing approaches. Without increasing the power supply of regulator or the reducing the value of VDDR, the PSR of the regulator is significantly improved. Embodiments included herein may provide better performance with the same power as previous architectures. Circuits of the present disclosure also do not impact the phase margin significantly and UGB remains similar. The high value PSR is obtained in the frequency range of supply noise variations by maintaining other parameters like the DC gain and offset of the regulator. Embodiments included herein may provide for additional circuits wherein the common source unity gain amplifier and compensation capacitor Cp may be laid out with a slight reshaping of the floorplan and without increasing area requirements.

It will be apparent to those skilled in the art that various modifications and variations can be made in the embodiments of the present disclosure without departing from the spirit or scope of the invention. Thus, it is intended that embodiments of the present disclosure cover the modifications and variations of this invention provided they come within the scope of the appended claims and their equivalents.

What is claimed is:

1. A voltage regulator circuit comprising:

a first stage amplifier circuitry; and a high gain loop connection circuitry electrically connected with the first stage amplifier circuitry, wherein the high gain loop connection circuitry includes a common source amplifier circuitry operatively connected to a VDDR net, wherein the common source amplifier circuitry includes a positive-channel metal-oxide semiconductor (PMOS) transistor electrically connected to a first negative-channel metal-oxide semiconductor (NMOS) transistor via a second drain node, and electrically connected to a second NMOS transistor via a gate node, wherein the common source amplifier circuitry is directly connected with a compensation capacitor, wherein the compensation capacitor is directly connected with a node associated with the first stage amplifier circuitry, wherein the node is electrically connected with a drain of a first transistor included within the first stage amplifier circuitry, wherein a signal current from the first transistor is mirrored by a second transistor, and the signal current flows from the second transistor to a third transistor included within the first stage amplifier circuitry, and from the third transistor to a fourth transistor directly connected to the VDDR net.

2. The voltage regulator circuit of claim 1, wherein the common source amplifier circuitry obtains negative gain so that the high gain loop connection circuitry forms a negative feedback loop.

3. The voltage regulator circuit of claim 1, wherein the first stage amplifier circuitry is directly connected with a second compensation capacitor.

4. The voltage regulator circuit of claim 3, wherein the first compensation capacitor and the second compensation capacitor have different values.

5. The voltage regulator circuit of claim 1, wherein the high gain loop connection circuitry operates at a frequency between 50 MHz and 500 MHz.

6. A voltage regulator circuit comprising:

a first stage amplifier circuitry; and a high gain loop connection circuitry electrically connected with the first stage amplifier circuitry, wherein the high gain loop connection circuitry includes a common source amplifier circuitry directly connected with a compensation capacitor, wherein the common source amplifier circuitry includes a positive-channel metal-oxide semiconductor (PMOS) transistor electrically connected to a first negative-channel metal-oxide semiconductor (NMOS) transistor via a second drain node, and electrically connected to a second NMOS transistor via a gate node, wherein the compensation capacitor is electrically connected with a node that is connected to a drain of a first transistor associated with the first stage amplifier circuitry, wherein a signal current from the first transistor is mirrored by a second transistor, and the signal flows from the second transistor to a third transistor included within the first stage amplifier circuitry, and from the third transistor to a fourth transistor directly connected to an output node.

7. The voltage regulator circuit of claim 6, wherein the common source amplifier circuitry obtains negative gain so that the high gain loop connection circuitry forms a negative feedback loop.

8. The voltage regulator circuit of claim 6, wherein the first stage amplifier circuitry is directly connected with a second compensation capacitor.

9. The voltage regulator circuit of claim 8, wherein the first compensation capacitor and the second compensation capacitor have different values.

10. The voltage regulator circuit of claim 6, wherein the high gain loop connection circuitry operates at a frequency between 50 MHz and 500 MHz.

11. A voltage regulator circuit comprising:

a first stage amplifier circuitry including a plurality of transistors;

a high gain loop connection circuitry electrically connected with the first stage amplifier circuitry, wherein the high gain loop connection circuitry includes a common source amplifier circuitry directly connected with a compensation capacitor, wherein the common source amplifier circuitry includes a positive-channel metal-oxide semiconductor (PMOS) transistor electrically connected to a first negative-channel metal-oxide semiconductor (NMOS) transistor via a second drain node, and electrically connected to a second NMOS transistor via a gate node, and wherein the compensation capacitor is electrically connected with a drain of a first transistor associated with the first stage amplifier circuitry, wherein a signal current from the first transistor is mirrored by a second transistor, and the signal current current flows from the second transistor to a third transistor included within the first stage amplifier circuitry, and from the third transistor to a fourth transistor directly connected to an output node.

12. The voltage regulator circuit of claim 11, wherein the common source amplifier circuitry obtains negative gain so that the high gain loop connection circuitry forms a negative feedback loop.

13. The voltage regulator circuit of claim 11, wherein the first stage amplifier circuitry is directly connected with a second compensation capacitor.

14. The voltage regulator circuit of claim 13, wherein the first compensation capacitor and the second compensation capacitor have different values.

15. The voltage regulator circuit of claim 11, wherein the high gain loop connection circuitry operates at a frequency between 50 MHz and 500 MHz.

16. A voltage regulator method comprising:

providing a first stage amplifier circuitry including a plurality of transistors;

electrically connecting high gain loop connection circuitry with the first stage amplifier circuitry, wherein the high gain loop connection circuitry includes a common source amplifier circuitry directly connected with a compensation capacitor, wherein the common source amplifier circuitry includes a positive-channel metal-oxide semiconductor (PMOS) transistor electrically connected to a first negative-channel metal-oxide semiconductor (NMOS) transistor via a second drain node, and electrically connected to a second NMOS transistor via a gate node, wherein the compensation capacitor is directly connected with a node associated with the first stage amplifier circuitry, wherein the node is electrically connected with a drain of a first transistor included within the first stage amplifier circuitry, wherein a signal current from the first transistor is mirrored by a second transistor, and the signal flows from the second transistor to a third transistor included within the first stage amplifier circuitry, and from the third transistor to a fourth transistor directly connected to the VDDR net.

17. The voltage regulator method of claim 16, wherein the common source amplifier circuitry obtains negative gain so that the high gain loop connection circuitry forms a negative feedback loop.

18. The voltage regulator method of claim 16, wherein the first stage amplifier circuitry is directly connected with a second compensation capacitor.

19. The voltage regulator method of claim 18, wherein the first compensation capacitor and the second compensation capacitor have different values.

20. The voltage regulator method of claim 16, wherein the high gain loop connection circuitry operates at a frequency between 50 MHz and 500 MHz.

* * * * *